United States Patent [19]

Harvey

[11] Patent Number: 5,041,008
[45] Date of Patent: Aug. 20, 1991

[54] ROLLED CARPET FOLDING AND TRANSPORTING DEVICE

[76] Inventor: Michel F. Harvey, 1866, des Tulipes, Carignan, Québec J3L 5E8, Canada

[21] Appl. No.: 481,229

[22] Filed: Feb. 20, 1990

[30] Foreign Application Priority Data

Feb. 20, 1989 [GB] United Kingdom ............... 8903765

[51] Int. Cl.$^5$ .......................................... B65H 45/12
[52] U.S. Cl. ................... 493/405; 493/444; 493/457
[58] Field of Search ............ 493/405, 395, 480, 254, 493/443, 444, 457; 72/389

[56] References Cited

U.S. PATENT DOCUMENTS 570,581  11/1896  Wendt ............................... 493/444
4,175,740 11/1979  Klenk ............................... 493/444

Primary Examiner—Frederick R. Schmidt
Assistant Examiner—John A. Marlott
Attorney, Agent, or Firm—Roland L. Morneau

[57] ABSTRACT

A device for folding rolled carpets essentially made of a rectangular frame having two pairs of upstanding posts at the corners of the frame. Roller means extending between each pair of posts are adapted to support the rolled carpets. A central bar disposed parallel to the roller means is connected to flexible links to at least one winch fixed to the frame below the central rod. The central rod is adapted to be mounted over the rolled carpets whereby by pulling on the rod, the carpets are folded in a V-shape, the end portions of the carpet being adapted to slide over the roller means.

10 Claims, 3 Drawing Sheets

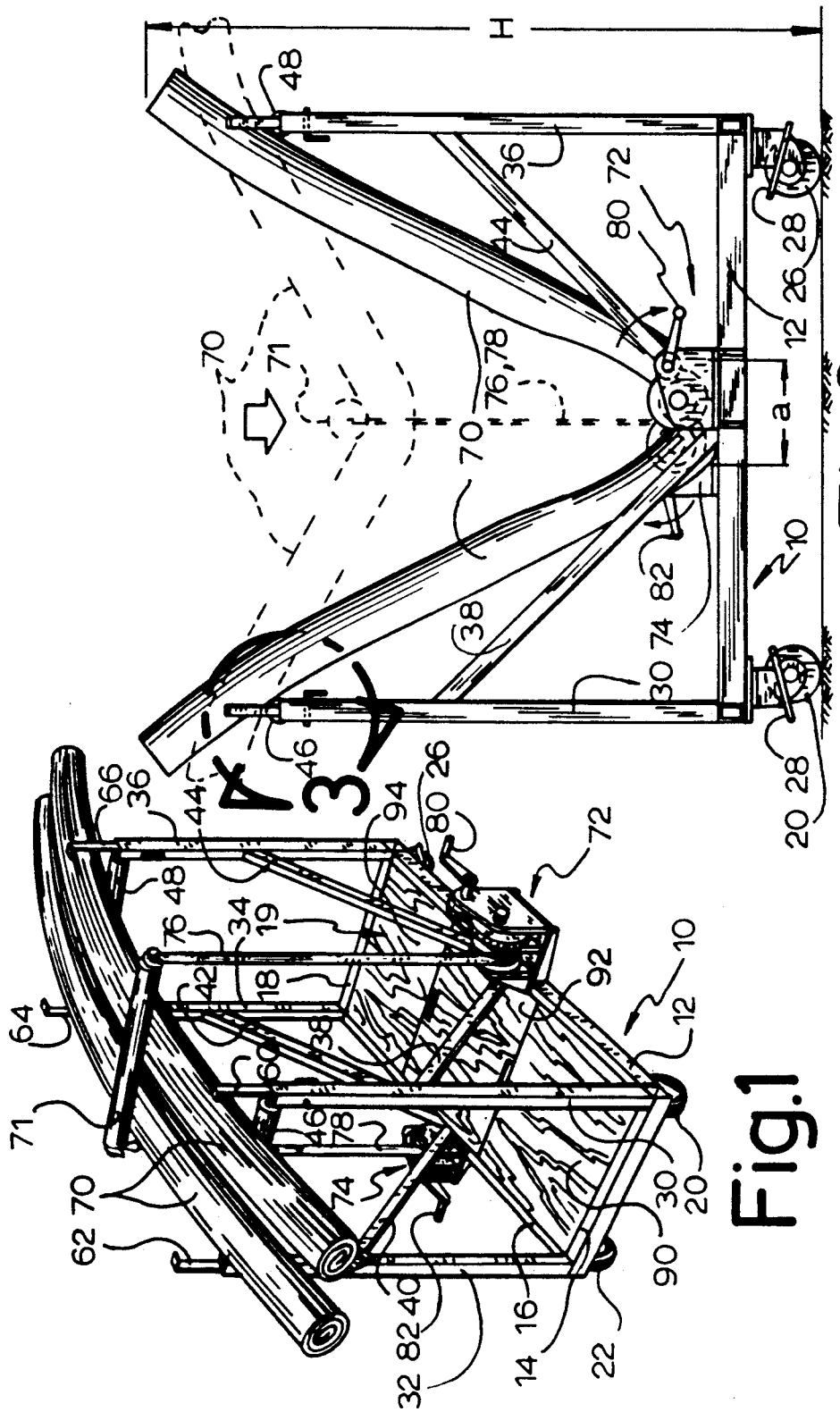

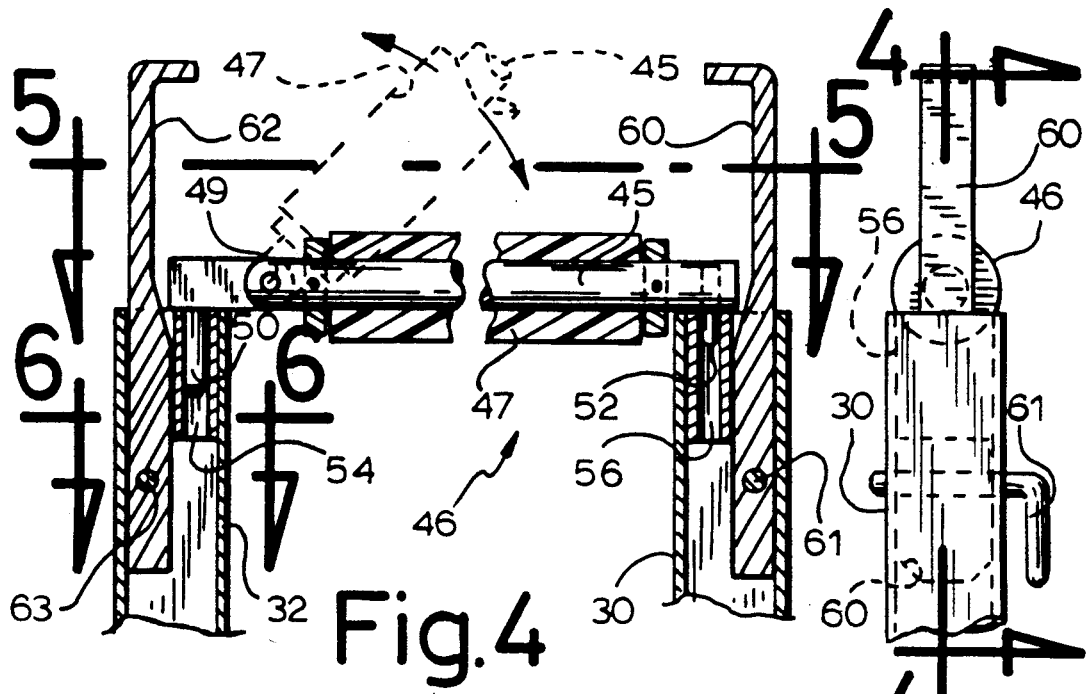

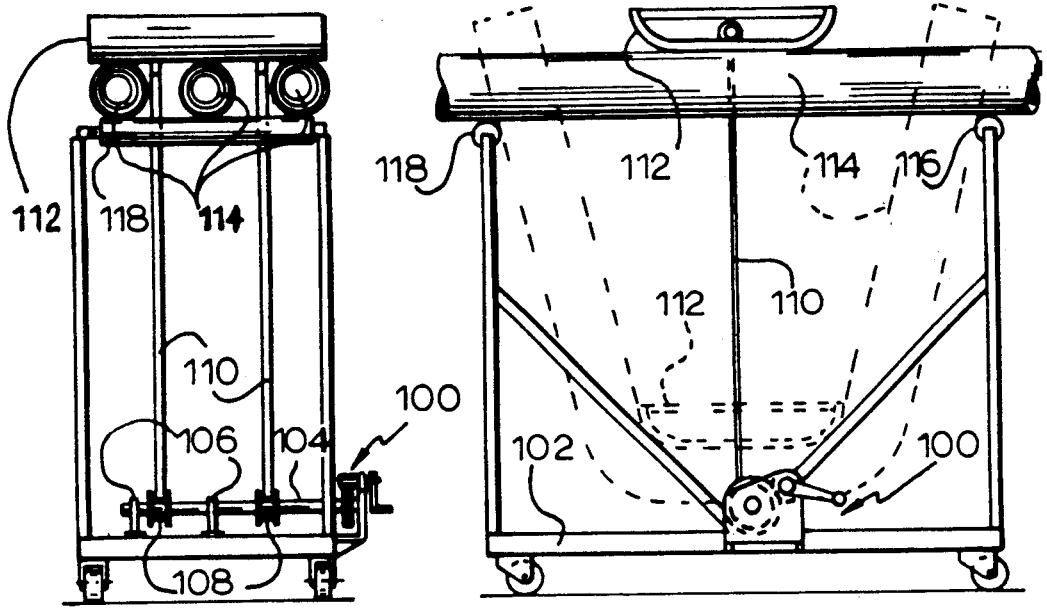
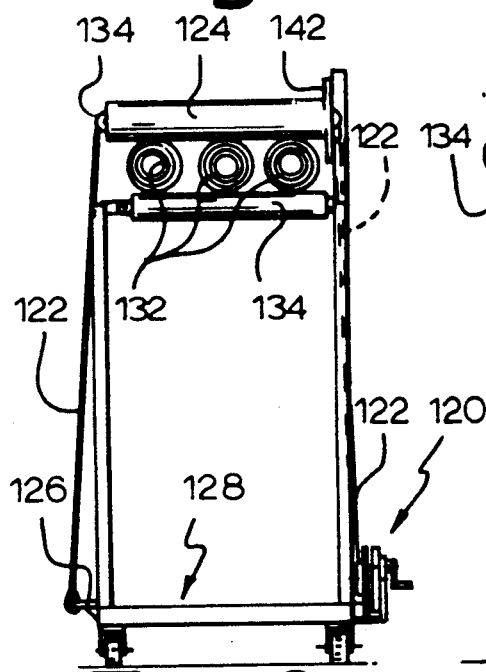
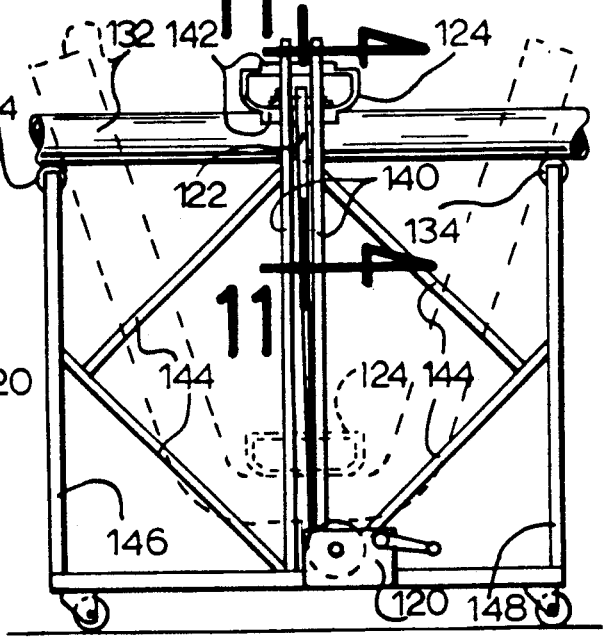
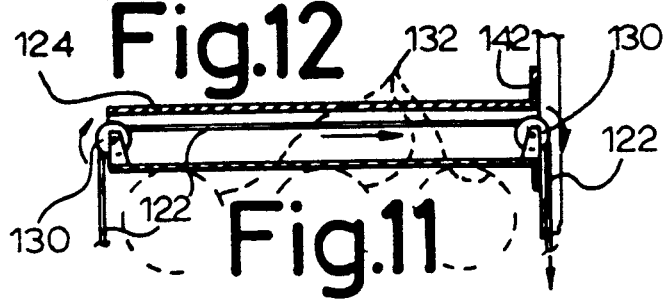

ROLLED CARPET FOLDING AND TRANSPORTING DEVICE

FIELD OF THE INVENTION

My invention relates generally to rolled carpet handling and transporting equipment, and more particularly to devices for folding rolled carpets and transporting these in a folded position.

BACKGROUND OF THE INVENTION

It is generally known in the carpet and carpet-laying industry that carpets are made available rolled up and in a width of generally 12 feet or more. Such rolled carpets are stiff and are not easily maneuvered (even by two people) particularly through doorways, around often winding corridors, and into and out of elevators. Carpet-layers therefore attempt to manually fold the rolled carpets at mid-width and transport them in a folded position. This, however, proves to be a difficult, if not impossible task due to the aforementioned stiffness of the rolled carpets, such a task often causing strain and physical injury to the carpet-layers.

In order to overcome these difficulties, it is an object of my invention to provide a novel device for easily folding rolled carpets and for transporting them, by one person in a folded position. Such device is adapted to prevent strain and physical injury to the carpet-layers.

BRIEF DESCRIPTION OF THE INVENTION

Broadly stated, my invention is directed to a device for folding rolled carpets comprising a substantially rectangular frame, two pairs of upstanding posts, each of the pair of posts adapted to be fastened at adjacent corners of the frame, means for rigidly maintaining each post in and upstanding position, roller means which extend between each pair of posts and supported by each pair of posts at substantially their upper end.

The roller means are adapted to support a rolled carpet extending partially outwardly beyond the frame. The device also comprises a central rod adapted to extend over and across the rolled carpet and means for downwardly pulling on the central rod, whereby the rolled carpet is substantially centrally pulled downwardly and folded in a V-shape, the outwardly extending portions of the rolled carpet being adapted to slidingly move on the roller means.

BRIEF DESCRIPTION OF THE DRAWINGS

FIG. 1 is a perspective view of a folding and transporting device for rolled carpets supporting a pair of rolled carpets;

FIG. 2 is a side view of the device shown in FIG. 1 while the carpets are folded;

FIG. 3 is an enlarged view of the detail encircled in FIG. 2;

FIG. 4 is a cross-sectional view along line 4—4 of FIG 3;

FIG. 5 is top of a central rod along line 5—5 of FIG. 4;

FIG. 6 is a cross-sectional view of a post along line 6—6 of FIG. 5;

FIG. 7 is a side view of the device as shown in FIG. 2 while one end of the rolled carpets is released;

FIG. 8 is a side view of another embodiment of the folding and transporting device;

FIG. 9 is a lateral view of the embodiment shown in FIG. 8;

FIG. 10 is a side view of a further embodiment according to the invention;

FIG. 11 is a cross-sectional view along line 11—11 of FIG. 10 and,

FIG. 12 is a lateral view of the embodiment shown in FIG. 10.

DESCRIPTION OF THE PREFERRED EMBODIMENT

Referring now to FIGS. 1 and 2, a substantially rectangular frame 10 is made of four peripheral bars 12, 14, 16 and 18 adapted to support a platform 19. The bars 12, 14 16 and 18 are preferably releasably fastened with nuts and bolts for easy assembly and dissassembly. The frame 10 is mounted on swivel wheel elements 20, 22, 24 (not seen) and 26 which give the device mobility. Preferably, at least two of the wheel elements have a braking mechanism 28 of a known type.

Each corner of frame 10 supports an upright post 30, 32, 34 and 36, respectively. Each upright post is further secured mid-height to one end of a diagonal bar 38, 40, 42 and 44 which is itself fastened at the other end to the mid-portion of the longitudinal bars 12 and 16 of the frame 10.

The diagonal bars are preferably releasably fastened to frame 10. Alternatively, a horizontal bar (not shown) may be fastened between posts 30, 36 and 32, 34 near their upper end.

At the upper end of each pair of posts 30, 32 and 34, 36 is provided a pair of lateral rollers 46, 48 generally made of a rod surrounded by a sleeve which is adapted to freely rotate over the rod. The sleeve is preferably made of rubber or a material against which a rolled carpet will frictionally engage.

The lateral roller 46 as shown in FIG. 4 includes a rod 45 and a sleeve 47 which can vertically pivot about an axle 49. Both ends of the rod 45 have a pin 50 and 52 perpendicularly mounted and slidably engagable in sleeves 54 and 56 respectively. When the rollers 46 are pivoted upwardly such as shown in dotted lines in FIG. 4, the pin 52 is lifted out of the sleeve 56. The rod 45 is connected to the pin 50 by a link 58. The rollers 46 are further adapted to rotate in a horizontal plane about the pin 50 in the sleeve 54.

Each of the posts 30, 32, and 36 have a similar telescopic extension members 60, 62, 64 and 66. Extension members 60 and 62 shown in FIGS. 3–6 slide inside posts 30 and 32 respectively and are held at a predeterminded height by lock pins 61 and 63 extending through apertures provided in the extension members 60 and 62, and their corresponding posts 30 and 32. The same applies to members 64 and 66 and their corresponding posts 34 and 36. Other apertures may be provided for adjusting the extension members at different desired heights.

FIGS. 1 and 2 show the basic device with elements for folding rolled carpets. Firstly, the brakes 28 of the wheels are engaged to prevent the device from moving. Then, one or more rolled carpets 70 are place horizontally across the rollers 46 and 48. They project outwardly and preferably equally beyond rollers 46 and 48. It is recommended to manually unroll and reroll more loosely the rolled carpets coming directly from the manufacturer in order to ease their subsequent folding. Also, the usual central cardboard tube must be removed from the rolled carpets prior to the folding of the latter.

With the rolled carpets in place on the device, telescopic posts 60, 62, 64 and 66 are raised out of posts 30, 32, 34 and 36 to an appropriate height in order to prevent the rolled carpets from slipping sideways off the device, particularly when folding. The telescopic posts are maintained at their desired height such as by the locking pins 61 and 63 (see FIG. 4).

A central rod 71 is placed over and across the midwidth of rolled carpets 70. Central rod 71 may be made extensible so its length may be adjusted according to the amount and size of the rolled carpets to be folded. Winch assemblies 72 and 74 are centrally located and removably fastened onto opposite sides of frame 10, with straps or cables 76 and 78 (such as of nylon) having a loop at their upper free end, the loops engaging around each end of central rod 71. Each winch 72 and 74 is offset so that the plane defined by the straps 76 and 78 correspond to the central axis of the frame 10.

The crank arms 80 and 82 of the winch devices are substantially simultaneously rotated, thereby pulling down on straps 76 and 78 and central rod 71. Straps 76 and 78 are preferably pulled in a vertical direction. As central rod 71 is pulled down, rolled carpets 70 are pulled down across their midwidth, thereby folding them substantially into a V-shape as shown in FIG. 2. As the folding of the stiff rolled carpets exerts outward pressure onto upright posts 30, 32, 34 and 36 previously described diagonal bars 38, 40 42 and 44 (or alternatively horizontal bars not shown) help maintain the upright posts in their original upright position.

Within the rectangular area of frame 10, the platform 19 is preferably made of three boards 90, 92 and 94 of plywood or other rigid material which are removably fastened onto frame 10 in order to provide a surface onto which the carpet-layers' tools, equipment and supplies can also be transported.

Rolled carpets 70 are pulled down (and folded) as close to platform 92 as possible. Platform 92 may be removed, particularly when several rolled carpets are being simultaneously folded, to allow the carpets to be pulled down beyond the level of the platform. The folded rolled carpets, beign stiff, will now remain stable, allowing the winch devices and straps to preferably be removed and extensible central rod 71 generally not being freeable from its position, is adjusted so there are no projections beyond the sides of the frame 10.

The device, now containing folded rolled carpets 70 and any additional equipment upon the platform, and being of a size allowing easy maneuvering (by one or more people) in doorways, corridors and elevators, is rolled to the desired location for unloading the folded rolled carpets after having disengaged braking mechanisms 28.

The rolled carpets will unload automatically, as shown in FIG. 7, after roller 46 is manually released as explained in the description of FIGS. 4 and 5. The device must therefore be oriented so as to allow plenty of room for the rolled carpets to fall outward between posts 30 and 32 without unnecessarily striking a wall, person or other item. The braking mechanisms 28 must also be engaged to prevent movement of the device while unloading the folded rolled carpets.

As shown in FIG. 4, roller 46 comprises a longitudinal rod 45 partially surrounded by a sleeve of rubber 47 or other similar material. At one end of rod 46 is a pin 52 projecting at a right angle, and inserted into post 30. The other end of rod 45 is adapted to be fastened onto pin element 50 such that roller 46 may pivot around it.

Folded rolled carpets 70 are unloaded when pin 52 is lifted out of post 30 (with a screwdriver or other flat and stiff object) and roller 46 pivots about pin 50 and axle 49 to reach the position shown in FIG. 7, i.e. along post 32. The rolled carpets 70 are then released from their folded position. One must be careful that nobody nor anything be in the path of the carpet falling in the direction of the arrow A and also in the path of the released roller 46. The carpets may then be removed from the device in all security.

FIGS. 8 and 9 show another embodiment of the invention which is characterized by a single winch 100 mounted on the side of the frame 102. The winch 100 rotates an axle 104 which is held to the frame 102 by a pair of bearing assembly 106. A pair of drums 108 are secured to the axle 104 for winding the straps 110 fixed to a central pressure member 112. The central pressure member 112 corresponds to the central rod 71 described above but is provided with a curved surface of greater radius for facilitating the bending of the rolled carpets 114 supported by the lateral rollers 116 and 118.

When the winch 100 is actuated, the straps 110 are wound around the drums 108 and pulls on the central pressure member 112 for reaching the bent position illustrated in dotted lines in FIG. 8. The embodiment illustrated in FIGS. 8 and 9 is preferred when only one operator is available because one winch is sufficient to bend the carpets 114. Furthermore, the central pressure member 112 having a greater radius of curvature facilitates the bending of the carpets even if three carpets 114 are simultaneously bent by one operator only.

A further embodiment of the invention is illustrated in FIGS. 10–12. This embodiment is also characterized by only one winch 120 which pulls on a cable or link 122 which slides into a hollow transversal member 124 and which is anchored at the other end to a bracket 126 fixed on the side of the frame 128. The hollow transversal member 124 interiorly supports a pair of rollers 130 to facilitate the sliding of the cable 122. The carpets 132 which are supported by lateral rollers 134 are urged downwardly by the hollow transversal member 124 when the winch 120 is actuated by one operator.

The embodiment illustrated in FIGS. 10–12 reduces the strength required to operate the winch 120 by one half because for every rotation of the winch 120, the hollow transversal member 124 will be lowered by half the distance compared to the displacement of the member 112 shown in FIG. 8.

As shown in figure in FIG. 10, the hollow transversal member 124 is guided in its vertical movement by guiding rails 140 to help maintain it in a vertical direction. The blade 142 which is secured to the hollow member 124 is adapted to slide between the two guiding rails 140. These guiding rails 140 are supported at the bottom by frame 128 and by a set of diagonal bars 144 laterally secured to post 146 and 148.

The devices fully described above are generally available in several parts to be easily assembled and disassembled on site and thereby requiring the least amount of space when transported between sites. The frame, posts and diagonal bars are generally of rigid tubular elements linked together in a collapsible way to form a kit. The winch assemblies are removably hooked to the frame on its outer perimeter. They are removed when the device needs to pass through narrow doors or elevators.

Thus, the present invention provides a device of easy and simple construction and operation, mobile, maneuverable and of light weight, which will greatly facilitate the handling and transporting of rolled carpets and other similar items.

Although the above described embodiments have been restricted to manually operated devices, it is within the scope of the present inventin to actuate the folding operation with an electric motor mounted for downwardly pulling on the central rods 71, 112 or 124. In the embodiment shown in FIG. 9, a motor is secured to the frame 102 and is substituted to the bearing assembly 106. The motor may be actuated by a 12-volt battery of the type used in trucks serving in the transportation of carpets. It may also be a motor adapted to be connected to an electric source of 110 volts commonly found in buildings and residences.

Having described the invention, modifications will be evident to those skilled in the art without departing from the spirit of the invention, as defined in the appended claims.

I claim:

1. A device for folding a rolled carpet comprising:
   a substantially rectangular frame,
   two pairs of posts, each of said pair of posts adapted to be fastened at adjacent corners of said frame,
   means for rigidly maintaining each of said posts in an upstanding position,
   roller member extending between each pair of posts and supported by each of said pair of posts at substantially the upper end thereof, said roller member adapted to support a rolled carpet extending partially outwardly beyond said frame, the distance between said roller member being such as to support rolled carpet in a substantially horizontal plane,
   a central rod adapted to extend over and across said roller carpet, said central rod being located substantially midway between said roller member,
   winch means secured to said frame, said winch means comprising flexible links releasably attached to each end of said central rod for downwardly pulling said central rod at each end thereof,
   whereby, said roller carpet is substantially centrally pulled downwardly and folded in a V-shape by said central rod upon actuation of said winch means, the outwardly extending portions of said rolled carpet slidingly moving on said roller member, the distance between said roller members being such as to support said outwardly extending portions when the carpet is folded.

2. A device as recited in claim 1, wherein said posts maintaining means is characterized by diagonal bars secured to the upstanding posts and to the frame, said diagonal bars extending in a plane perpendicular to the direction of the said roller members.

3. The device as defined in claim 1, further comprising swivel wheel elements mounted under said frame, said wheel elements enabling mobility of said device.

4. The device as defined in claim 1, wherein one of said roller members is releasably mounted to one of said pair of posts and pivotably mounted to the other of said pair of posts for enabling said roller member to pivot along a substantially horizontal plane,
   whereby the rolled carpet supported by roller members is adapted to be released from said one of said roller members.

5. The device as defined in claim 1, further comprising telescopic posts adapted to be raised out of and pushed into each of said upstanding posts,
   means to releasably maintain said telescopic posts at predetermined elevations,
   wherein said telescopic posts prevent sideways slipping of said rolled carpet away from said roller members.

6. The device as defined in claim 1, further comprising at least one releasably mounted rigid platform on said frame wherein said platform provides a surface for the transport of equipment.

7. The device as defined in claim 1, wherein said means for downwardly pulling on said central rod comprises a winch assembly, said assembly mounted onto one side of said frame substantially vertically below one end of said central rod, said winch assembly having a flexible link adapted to hold said central rod, whereby the operation of said winch assembly produces a downward pulling motion onto said central rod via said link and on said carpet.

8. The device as defined in claim 7, wherein said winch assembly to releasably mounted on said frame.

9. A device as defined in claim 7, wherein said central rod is hollow and has a pair of pulleys mounted therethrough, said flexible link extending between said winch assembly and a portion of said frame opposite said winch, said link passing over said pulleys.

10. A device as recited in claim 7, wherein said downwardly pulling means comprises a pair of winch assemblies mounted onto opposite sides of said frame substantially vertically below each end of said central rod, each of said winch assemblies having a flexible link for holding one of the ends of said rod.

* * * * *